United States Patent
Maier et al.

(10) Patent No.: US 12,116,546 B2
(45) Date of Patent: Oct. 15, 2024

(54) HIGH VISCOSITY BASE FLUIDS BASED ON OIL COMPATIBLE POLYESTERS

(71) Applicant: Evonik Operations GmbH, Essen (DE)

(72) Inventors: Stefan Karl Maier, Ober-Ramstadt (DE); Peter Altenbuchner, Muenster (DE); Fabian Ziegler, Darmstadt (DE); Christiane Zatocil, Herten (DE); Stefan Hilf, Zwingenberg (DE); Emily Clare Schweißinger, Dortmund (DE); Jens Elsner, Hochheim (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/003,938

(22) PCT Filed: Jul. 1, 2021

(86) PCT No.: PCT/EP2021/068134
§ 371 (c)(1),
(2) Date: Dec. 30, 2022

(87) PCT Pub. No.: WO2022/003087
PCT Pub. Date: Jan. 6, 2022

(65) Prior Publication Data
US 2023/0257673 A1 Aug. 17, 2023

(30) Foreign Application Priority Data
Jul. 3, 2020 (EP) ..................................... 20183876

(51) Int. Cl.
| | | |
|---|---|---|
| C10M 145/22 | (2006.01) | |
| C08G 63/42 | (2006.01) | |
| C10M 169/04 | (2006.01) | |
| C10N 20/02 | (2006.01) | |
| C10N 20/04 | (2006.01) | |
| C10N 40/04 | (2006.01) | |

(52) U.S. Cl.
CPC ........... *C10M 145/22* (2013.01); *C08G 63/42* (2013.01); *C10M 169/041* (2013.01); *C10M 2203/003* (2013.01); *C10M 2209/102* (2013.01); *C10N 2020/02* (2013.01); *C10N 2020/04* (2013.01); *C10N 2040/04* (2013.01)

(58) Field of Classification Search
CPC ............ C10M 145/22; C10M 169/041; C10M 2203/003; C10M 2209/102; C10M 2203/1006; C10M 2203/1025; C10M 2203/1065; C10M 2209/1023; C10M 107/32; C08G 63/42; C08G 63/16; C10N 2020/02; C10N 2020/04; C10N 2040/04
USPC ...................................................... 508/492
See application file for complete search history.

(56) References Cited

U.S. PATENT DOCUMENTS

| | | | |
|---|---|---|---|
| 3,968,148 A | 7/1976 | Leister et al. | |
| 4,125,521 A | 11/1978 | Murakami et al. | |
| 4,200,560 A | 4/1980 | Kubo et al. | |
| 5,435,928 A | 7/1995 | Beck | |
| 5,691,284 A | 11/1997 | Beyer et al. | |
| 5,849,974 A | 12/1998 | Clarembeau et al. | |
| 6,599,864 B1 | 7/2003 | Bertomeu | |
| 9,617,495 B2 | 4/2017 | Ghahary et al. | |
| 2009/0198075 A1* | 8/2009 | Miller .................. | C10M 105/38 549/523 |
| 2013/0165360 A1 | 6/2013 | Patil et al. | |
| 2016/0083754 A1* | 3/2016 | Medoff .................. | C12P 19/02 435/129 |

FOREIGN PATENT DOCUMENTS

| | | |
|---|---|---|
| DE | 3 223 694 | 3/1983 |
| DE | 10 2010 028195 | 10/2011 |
| EP | 0 471 266 | 2/1992 |
| EP | 0 668 342 | 8/1995 |
| EP | 0 776 959 | 6/1997 |
| EP | 1 029 029 | 8/2000 |
| EP | 2 970 532 | 1/2016 |
| EP | 3 315 591 | 5/2018 |
| JP | 10-72562 | 3/1998 |
| WO | 97/21788 | 6/1997 |
| WO | 99/20720 | 4/1999 |
| WO | 99/41332 | 8/1999 |
| WO | 00/08115 | 2/2000 |

(Continued)

OTHER PUBLICATIONS

International Search Report dated Sep. 6, 2021, in PCT/EP2021/068134, 5 pages.
Ray et al., "Poly-α-olefin-based synthetic lubricants: a short review on various synthetic routes", Lubrication Science, vol. 24, 2012, pp. 23-44.
Written Opinion dated Sep. 6, 2021, in PCT/EP2021/068134, 8 pages.

*Primary Examiner* — Prem C Singh
*Assistant Examiner* — Francis C Campanell
(74) *Attorney, Agent, or Firm* — Grüneberg and Myers PLLC

(57) ABSTRACT

A polyester is useful as a high viscosity base fluid. A method for its preparation involves isomerizing an alpha-olefin, epoxidizing an internal olefin, reacting an internal epoxide, and isolating the polyester. Lubricant compositions can contain such polyesters and the compositions are useful as automatic transmission fluids, manual transmission fluids, continuously variable transmission fluids, gear oil formulations, industrial gear oil formulations, axle fluid formulations, dual clutch transmission fluids, dedicated hybrid transmission fluids, or as hydraulic oils.

22 Claims, No Drawings

(56) References Cited

FOREIGN PATENT DOCUMENTS

| WO | 00/14179 | 3/2000 |
|----|----------|--------|
| WO | 00/14183 | 3/2000 |
| WO | 00/14187 | 3/2000 |
| WO | 00/14188 | 3/2000 |
| WO | 00/15736 | 3/2000 |
| WO | 01/18156 | 3/2001 |
| WO | 01/46350 | 6/2001 |
| WO | 01/57166 | 8/2001 |
| WO | 2013/189951 | 12/2013 |
| WO | 2014/150533 | 9/2014 |

* cited by examiner

HIGH VISCOSITY BASE FLUIDS BASED ON OIL COMPATIBLE POLYESTERS

CROSS-REFERENCE TO RELATED APPLICATIONS

This application is the National Stage entry under § 371 of International Application No. PCT/EP2021/068134, filed on Jul. 1, 2021, and which claims the benefit of priority to European Application No. 20183876.0, filed on Jul. 3, 2020. The content of each of these applications is hereby incorporated by reference in its entirety.

BACKGROUND OF THE INVENTION

Field of the Invention

The present invention is directed to polyesters, a method for their preparation and their use as high viscosity base fluids. It is further directed to lubricant compositions comprising such polyesters and to the use of such compositions as automatic transmission fluids, manual transmission fluids, continuously variable transmission fluids, differential gear oil formulations, industrial gear oil formulations, axle fluid formulations, dual clutch transmission fluids, dedicated hybrid transmission fluids or as hydraulic oils.

Description of Related Art

High viscosity base fluids are commonly used to lift the viscosity index (VI) and to thicken lubricant formulations with demanding shear stability requirements. A typical application are gear oils which have very demanding requirements due to high mechanical stress and a broad temperature range in operation.

High viscosity base fluids are known to have a kinematic viscosity at 100° C. ($KV_{100}$) of 30 to 1000 cSt.

Industrial gearboxes are expected to perform under conditions of high heat and heavy loads; and in environments are often contaminated with dirt, process debris and water. Without adequate protection, gears will wear prematurely. That means that certain parts have to be replaced more frequently, the oil has to be changed more frequently, and worst of all, equipment downtime has to be expected.

Today's gear driven equipment is designed to perform in many applications, often having to withstand harsh environments. Typically, gear boxes are becoming smaller and are being made from lighter and more sophisticated materials, yet they must be more durable than ever before. As a result, greater demands are being placed upon the gear oil lubricant and greater consideration must be given to the use of high-performance base fluids and additives.

Typical products in this market are high viscosity poly-alphaolefins (PAOs) and metallocene catalyzed PAOs (mPAOs), typically sold in viscosity ranges of 40 to 300 cSt at 100° C. (Choudary et al., Lubricant Sciences 2012, 23-44). Formulations based on high viscosity PAOs are known to have the best performance at low temperatures, but their weakness is the low polarity. Due to the apolar nature of PAO base oils, dispersion inhibitor (DI) packages and ageing products are poorly dissolved in the oil causing various problems.

Higher polarity is provided by copolymers of alpha-olefins with maleates (U.S. Pat. No. 5,435,928), oligomers of alpha-olefins with alkyl acrylates (U.S. Pat. No. 3,968,148) or copolymers of alpha-olefins with alkyl methacrylates (U.S. Pat. No. 5,691,284). Alternatively, PAOs with ester-functionalized monomers (EP2970532) or polyvinylethers (US 2013/0165360) can be applied. A big advantage of using polar high viscosity base fluids is that no polar low viscous fluids, such as esters, must be used as compatibilizers for the DI package. Polar low viscous fluids are known to cause problems with coatings and seals which is less of an issue for high viscosity fluids.

Ester fluids are commonly used as compatibilizers. There is reported a variety of suitable diesters and polyesters (L. R. Rudnick, Synthetics, Mineral Oils, and Bio-Based Lubricants: Chemistry and Technology, $2^{nd}$ Edition, 2013, page 51ff). Unfortunately, the options are limited to esters with low molecular weight as complex esters are not compatible with the apolar base oils used in the application. An exception are polyesters made from dimer acids, but these provide low performance in lubricants due the cyclic structures which are a result of the dimer acid production process (WO 01/46350).

Polyesters can be made from diacids and diols. The idea behind using dimer acids is to introduce the oil compatibility via a more apolar diacid. An alternative could be the use of diols made by epoxidation of alpha olefins. Such epoxides can be used to make oil-compatible polyalkyleneglycols (L. R. Rudnick, Synthetics, Mineral Oils, and Bio-Based Lubricants: Chemistry and Technology, $2^{nd}$ Edition, 2013, page 123ff; EP 3315591). The carbon number of the diol and diacid unit is limited as long, linear carbon chains induce crystallinity in the polymer which hinders the use of the resulting polyester as a lubricant.

It was further found that epoxides made from alpha-olefins do either provide low solubility in base oils or show too high crystallinity to be used as high viscosity base fluids.

SUMMARY OF THE INVENTION

In order to overcome this problem, it was now surprisingly found that epoxides prepared from internal olefins can be used to prepare polyesters that show surprisingly low polymer crystallinity and good oil compatibility.

This strong effect can be attributed to the combination of shorter side-chains and a largely increased degree of branching in comparison to polyesters made from epoxides derived from alpha-olefins.

DETAILED DESCRIPTION OF THE INVENTION

A first object of the present invention is directed to polyesters prepared from internal epoxides derived from internal olefins or from diols that are derived from internal epoxides comprising 10 to 24 carbon atoms and dicarboxylic acids comprising 5 to 13 carbon atoms.

The molar ratio of carbon to oxygen in the polyesters is preferably in the range of 4:1 to 12:1, more preferably in the range of 5:1 to 9:1, and even more preferably in the range of 6:1 to 7.5:1.

The number-average molecular weight $M_n$ of the polyesters according to the present invention is preferably in the range from 1,000 to 15,000 g/mol, preferably 2,000 to 10,000 g/mol.

Preferably, the polyesters according to the present invention have a polydispersity index (PDI) $M_w/M_n$ in the range of 1.5 to 6, preferably in the range of 1.8 to 5, more preferably in the range of 2 to 4.

$M_w$ and $M_n$ are determined by size exclusion chromatography (SEC) using commercially available polymethylmethacrylate standards. The determination is affected by gel permeation chromatography with THF as eluent.

The term "internal epoxides" means epoxides prepared from internal olefins.

The term "internal olefins" means olefins containing an internal unsaturated double bond. Internal olefins may be produced from their corresponding alpha-olefins by isomerization processes. There are several catalysts known for the isomerization of alpha-olefins to internal olefins. Active catalysts can reach the thermodynamic isomerization limit, thereby giving internal olefins with an equilibrium distribution of double bond isomers.

Internal olefins may be produced from their corresponding alpha-olefins by isomerization processes and are commercially available.

Various catalysts are known for their use in the double bond isomerization of olefinic compounds. These are mainly zeolites and mole sieves as well as resin-type acidic systems (U.S. Pat. No. 5,849,974). However, many of these catalysts produce substantial amounts of polymer and/or skeletal isomerized product; i.e., branched olefins or dimers or oligomers. For some applications, it is desirable to limit branched products to the least amount possible. Therefore, for certain applications, it is desirable to use a catalyst which is selective for the isomerization of the double bond without the isomerization of the skeletal structure or the formation of dimers or higher oligomers. The formations of dimers and higher oligomers are side reactions of acidic catalyst systems. To avoid these side reactions, basic catalysts or catalysts doped with alkaline or earth alkaline metals are used.

The olefin feedstock used in accordance with the present invention is selected from alpha-olefins comprising 10 to 24 carbon atoms, preferably 12 to 20 carbon atoms and most preferably 14 to 18 carbon atoms. The invention is not limited to feedstocks comprising a single component; mixtures of more than one component also with different chain length may be used as well.

In a further embodiment, the olefin feedstock used as starting material is a mixture of alpha-olefins comprising at least 90% by weight of mono-olefinic linear alpha-olefins.

The internal olefins useable for the epoxidation in the present invention comprise not more than 30 mol %, preferably not more than 20 mol %, preferably not more than 10 mol %, of double bonds being in the alpha-position in order to avoid crystallization of the sidechains of the resulting polyesters.

The dicarboxylic acids usable in the present inventions are saturated linear aliphatic dicarboxylic acids selected from the group consisting of glutaric acid (pentanedioic acid), 2,2-dimethylglutaric acid (2,2-dimethylpentanedioic acid), adipic acid (hexanedioic acid), 2,4,4-timethyladipic acid (2,4,4-timethylhexanedioic acid), pimelic acid (heptanedioic acid), suberic acid (octanedioic acid), azelaic acid (nonanedioic acid), sebacic acid (decanedioic acid), undecanedioic acid, dodecanedioic acid, brassylic acid (tridecanedioic acid) and mixtures thereof; preferred are azelaic acid (nonanedioic acid), sebacic acid (decanedioic acid), dodecanedioic acid and mixtures thereof. The main industrial process employed for manufacturing dicarboxylic acids is the ring-opening oxidation of cyclic compounds. They are generally manufactured on an industrial scale and are therefore commercially available.

In the polyesters according to the present invention, preferably 30% or less, more preferably 20% or less, more preferably 10% or less of the terminal functionalities are COOH-functionalities.

The polyesters according to the present invention are characterized by a melting point of equal to or below $-15°$ C., preferably equal to or below $-25°$ C.; more preferably, they do not have any melting point. If the melting point is higher, the polyesters cannot be used as base oils.

The polyesters of the present invention are further characterized by a glass transition temperature of equal to or below $-50°$ C.

The bulk viscosity of the polyesters, measured as kinematic viscosity at $100°$ C., is in the range of 40 to 2000 cSt, preferably in the range of 100 to 1000 cSt, more preferably 200 to 500 cSt.

A second object of the present invention is directed to the use of the polyesters as described herein before as base oils in lubricant formulations, especially in gear oil formulations.

A further object of the present invention is directed to a method of lubricating a gear, comprising the steps of:

(i) preparing a formulation by using at least one polyester as described further above as a base oil;

(ii) optionally combining the polyester with another base oil selected from the group consisting of API Group II oils, API Group III oils, API Group IV oils, and mixtures thereof; and (iii) applying the formulation prepared under (ii) to an industrial gear.

A third object of the present invention is directed to lubricating composition, comprising:

(A) 20 to 60% by weight of at least one polyester prepared from internal epoxides that are derived from internal olefins comprising 10 to 24 carbon atoms, preferably 12 to 20 carbon atoms, more preferably 14 to 18 carbon atoms, or from diols that are derived from that internal epoxides, and diacids comprising 5 to 13 carbon atoms;

(B) 40 to 80% by weight of a base oil selected from the group consisting of API Group II oils, API Group III oils, API Group IV oils, and mixtures thereof; and (C) 0 to 5% by weight of one or more additives.

The content of each component (A), (B) and (C) is based on the total weight of the base oil composition. In a particular embodiment, the proportions of components (A), (B) and (C) add up to 100% by weight.

The polyesters to be used are as described further above.

The base oil to be used in the lubricating composition comprises an oil of lubricating viscosity. Such oils include natural and synthetic oils, oils derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
| --- | --- | --- | --- |
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare a lubricating composition in accordance with the present invention is preferably in the range of 5 mm/s to 15 mm/s, more preferably in the range of 6 mm/s to 113 mm/s, and even more preferably in the range of 8 mm/s to 12 mm/s, determined to ASTM D445.

Particularly preferred lubricants of the present invention comprise at least one base oil selected from the group consisting of API Group II oils, API Group III oils, polyalphaolefins (PAO) and mixtures thereof.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 688 342, WO 97/21788, WD 00/15736, WD 00/14188, WO 00/14187, WD 00/14183, WD 00/14179, WO 00/08115, WD 99/41332, EP 1 029 029, WO 01/18156, WO 01/57166 and WO 2013/189951.

Especially for gear oil formulations are used base oils of API Group II, III, IV or mixtures thereof.

The lubricating composition according to the invention may also contain, as component (C), further additives selected from the group consisting of pour point depressants, dispersants, defoamers, detergents, demulsifiers, antioxidants, antiwear additives, extreme pressure additives, friction modifiers, anticorrosion additives, dyes and mixtures thereof.

Preferred pour point depressants are, for example, selected from the group consisting of alkylated naphthalene and phenolic polymers, polyalkyl methacrylates, maleate copolymer esters and fumarate copolymer esters, which may conveniently be used as effective pour point depressants. The lubricating oil composition may contain 0.1% by weight to 0.5% by weight of a pour point depressant. Preferably, not more than 0.3% by weight of a pour point depressant is used.

Appropriate dispersants include poly(isobutylene) derivatives, for example poly(isobutylene)succinimides (PIBSIs), including borated PIBSIs; and ethylene-propylene oligomers having N/O functionalities.

Suitable defoaming agents include, for example, silicone oils, fluorosilicone oils, and fluoroalkyl ethers.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Preferred demulsifiers include alkyleneoxide copolymers and (meth)acrylates including polar functions.

The suitable antioxidants include, for example, phenols, for example 2,6-di-tert-butylphenol (2,6-DTB), butylated hydroxytoluene (BHT), 2,6-di-tert-butyl-4-methylphenol, 4,4'-methylenebis(2,6-di-tert-butylphenol); aromatic amines, especially alkylated diphenylamines, N-phenyl-1-naphthylamine (PNA), polymeric 2,2,4-trimethyldihydroquinone (TMQ); compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbomadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

The preferred antiwear and extreme pressure additives include phosphorus compounds, for example trialkyl phosphates, triaryl phosphates, e.g. tricresyl phosphate, amine-neutralized mono- and dialkyl phosphates, ethoxylated mono- and dialkyl phosphates, phosphites, phosphonates, phosphines; compounds having sulfur and phosphorus, for example metal dithiophosphates, e.g. zinc di-$C_{3-12}$-alkyldithiophosphates (ZnDTPs), ammonium dialkyldithiophosphates, antimony dialkyldithiophosphates, molybdenum dialkyldithiophosphates, lead dialkyldithiophosphates, "OOS triesters"=reaction products of dithiophosphoric acid with activated double bonds from olefins, cyclopentadiene, norbomadiene, α-pinene, polybutene, acrylic esters, maleic esters, triphenyl phosphorothionate (TPPT); compounds having sulfur and nitrogen, for example zinc bis(amyldithiocarbamate) or methylenebis(di-n-butyl dithiocarbamate); sulfur compounds with elemental sulfur and $H_2S$ sulfurized hydrocarbons (diisobutylene, terpene); sulfurized glycerides and fatty acid esters; overbased sulfonates; chlorine compounds or solids, such as graphite or molybdenum disulfide.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Dispersants (including borated dispersants) are preferably used in a concentration of 0% to 2% by weight, defoamers in a concentration of 10 to 2500 ppm, detergents in a concentration of 0.05% to 1% by weight, demulsifiers in a concentration of 0% to 0.1% by weight, antioxidants in a concentration of 0.5% to 1.5% by weight, antiwear and extreme pressure additives each in a concentration of 0.1% to 1% by weight, friction modifiers in a concentration of 0.05% to 2% by weight, anticorrosion additives in a concentration of 0.05% to 0.5% by weight, and dyes in a concentration of 0.01% to 1% by weight. The concentration is based in each case on the total weight of the lubricating oil composition.

Preferably, the total concentration of the one or more additives (C) in a lubricating oil composition is up to 5% by weight, more preferably 0.1% to 4% by weight, more preferably 0.5% to 3% by weight, based on the total weight of the lubricating oil composition.

A further object of the present invention is directed to a method for preparing the polyesters according to the present invention, the process comprising the steps of:
(a) isomerizing an alpha-olefin comprising 10 to 24 carbon atoms, preferably 12 to 20 carbon atoms, more preferably 14 to 18 carbon atoms, to an internal olefin;
(b) epoxidizing the internal olefin retrieved under step (a);
(c1) reacting the internal epoxide retrieved under step (b) with a dicarboxylic acid comprising 5 to 13 carbon atoms, or
(c2) transferring the internal epoxide retrieved under step (b) to the corresponding diol and reacting the diol with a dicarboxylic acid comprising 5 to 13 carbon atoms; and
(d) isolating the desired polyester.

The invention has been further illustrated by the following non-limiting examples.

Experimental Part

Abbreviations

ADI adipic acid
AN acid number
AZE azelaic acid
BV40 bulk viscosity @40° C.
CP cloud point
DDS dodecanedioic acid
KV kinematic viscosity measured according to ASTM D445
$KV_{40}$ kinematic viscosity measured @40° C. to ASTM D445
$KV_{100}$ kinematic viscosity measured @100° C. to ASTM D445
$M_n$ number-average molecular weight
$M_w$ weight-average molecular weight
NB3020 Nexbase® 3020; Group III base oil from Neste with a $KV_{100}$ of 2.2 cSt
NB3043 Nexbase® 3043; Group III base oil from Neste with a $KV_{100}$ of 4.3 cSt
NS3 naphthenic base oil from Nynas with a $KV_{40}$ of 3 cSt
OHN hydroxyl number
PDI polydispersity index
PP pour point
SEB sebacic acid
TMAS 2,4,4-trimethyladipic acid
VI viscosity index
Test Methods The polyesters according to the present invention and the comparative examples were characterized with respect to their molecular weight, PDI, bulk viscosity at 100° C. ($BV_{100}$), pour point (PP), melting point $T_m$, glass transition temperature $T_g$, OH number and acid number. Molecular weights were determined by size exclusion chromatography (SEC) using commercially available polymethylmethacrylate (PMMA) standards. The determination is effected by gel permeation chromatography (GPC) to DIN 55672-1 with THF as eluent (flow rate: 1 mL/min; injected volume: 100 µl).

The bulk viscosity $BV_{100}$ was determined to ASTM D445.

The pour point was determined to ASTM D97.

Determining the thermal properties ($T_g$ and $T_m$) of the polyesters employed in the present invention was carried out by differential scanning calorimetry (DSC) according to DSC method DIN 11357-1.

The OH-number of the polyesters was determined titrimetrically in mg KOH/g polymer according to DIN 53240-2.

The acid number of the polyesters was determined by titration according to DIN EN ISO 2114.

Values are reported as mg (KOH)/g (sample).

The lubricating compositions including the polyesters according to the present invention and comparative examples were characterized with respect to kinematic viscosity at 40° C. ($KV_{40}$) and 100° C. ($KV_{100}$) to ASTM D445, their viscosity index (VI) to ASTM D2270, their pour point to ASTM D97 and their cloud point to ASTM D5773.

Preparation of the Silicon-Aluminum Mixed Oxide

The vapor of a mixture consisting of 45 kg/h of $CH_3SiCl_3$ and 15 kg/h of $SiCl_4$ and the vapor of 0.6 kg/h of aluminum chloride were introduced separately from one another by means of nitrogen as carrier gas into a mixing chamber. The vapors were mixed with 14.6 standard m³/h of hydrogen and 129 standard m³/h of dried air in the mixing chamber of a burner, fed via a central tube, at the end of which the reaction mixture is ignited, into a water-cooled flame tube and burnt there. The powder formed was subsequently deposited in a filter and treated with water vapor at 400 to 700° C. The powder contained 99% by weight of silicon dioxide and 1% by weight of aluminum oxide. The BET surface area was 173 m²/g. The DBP number was 326 g/100 g of mixed oxide.

To determine the weight ratio $(Al_2O_3/SiO_2)_{surface}$ of the primary particles in a surface layer having a thickness of about 5 nm, XPS analysis was employed. This resulted in a weight ratio $(Al_2O_3/SiO_2)_{surface}$ of 0.0042. The determination of the weight ratio $(Al_2O_3/SiO_2)_{ttl}$ in the total primary particle was carried out by X-ray fluorescence analysis on the powder. It showed a weight ratio $(Al_2O_3/SiO_2)_{ttl}$ of 0.010. This resulted in a value for $(Al_2O_3/SiO_2)_{ttl}(Al_2O_3/SiO_2)_{surface}$ of 2.4.

Synthesis of Internal C14 Olefin

The isomerization reaction of alpha-tetradecene (commercially available from Shell or Chevron) in the continuous operation mode was carried out in a setup consisting of feed vessel, an HPLC-pump, a pre-heating zone, two consecutive tubular fixed-bed reactors located in a heating oven, and a product vessel. The setup was filled with 6 g of fresh silicon-aluminum mixed oxide as catalyst. The feed consisted of alpha-tetradecene and was pumped via the HPLC pump first through the preheating zone, where the feed liquid was heated to reaction temperature, and then from the bottom to the top through the first and subsequently through the second tubular fixed-bed reactor. This ensured that the reactors were entirely filled with liquid. The reaction mixture was cooled after the reaction zone to ambient temperature and stored in the product tank. The feed tank as well as the product tank were purged with nitrogen.

Reaction Conditions:
WHSV value=3.0 to 3.9 h$^{-1}$
reaction temperature=160° C. to 180° C.
pressure=atmospheric Preparation of Tungsten-Containing Catalyst Solution 2667 g of distilled water, 133 g of $H_2O_2$ (30 wt % aqueous solution), 101 g of sodium tungstate and 160 g of phosphoric acid (85 wt % aqueous solution) were mixed and stored over night Synthesis of Internal C14-Epoxide A reactor equipped with a mechanical stirrer was charged with 5010 g of internal C14-olefin and 66.9 g of tetra-alkyl ammoniummethosulfate (55% aqueous solution). 1500 g of the tungsten-containing catalyst solution were subsequently pumped into the reactor and the resulting reaction mixture heated to 80° C. After the desired temperature was reached, four portions of 1104 g of hydroperoxide (22 wt % aqueous solution) each were dosed into the reaction vessel within 20 minutes, each followed by a dosing pause of 10 minutes. The resulting reaction mixture was further stirred under 80° C. for another 240 minutes. Subsequently, heating and stirring were stopped and the reaction mixture stored over night for phase separation.

The organic phase was separated and filtered under high pressure using PuraMem® S600 flat sheets as membrane.

Synthesis of Internal C15-18-Epoxides

A reactor equipped with a mechanical stirrer was charged with 5667 g of a mixture of internal olefins comprising C15-18 carbon atoms and 76 g of tetra-alkyl ammonium methosulfate (55% aqueous solution). 1275 g of the tungsten-containing catalyst solution were subsequently pumped into the reactor and the resulting reaction mixture heated to 80° C. After the desired temperature was reached, four portions of 1251 g of hydroperoxide (22 wt % aqueous solution) each were dosed into the reaction vessel within 20 minutes, each followed by a dosing pause of 10 minutes. The resulting reaction mixture was further stirred under 80° C. for another 240 minutes. Subsequently, heating and stirring were stopped and the reaction mixture stored overnight for phase separation. The organic phase was separated and purified by filtration over neutral $Al_2O_3$.

Synthesis of Polyesters

A round-bottom flask equipped with a reflux condenser, mechanical stirrer, nitrogen inlet and thermometer was charged with epoxide, acid and catalyst under nitrogen bubbling. Subsequently, the reaction mixture was heated over time 1 to 225° C. After an additional time 2, the desired acid number was reached, and the reaction stopped.

The amounts of epoxide, acid and catalyst used to prepare working examples and comparative examples are shown in the following Table 1. As catalyst was always used tin(II) 2-ethylhexanoate (commercially available from TIB Chemicals AG).

TABLE 1

Compositions of reaction mixtures used to prepare the working examples and comparative examples.

| Example # | Epoxide | Amount | Diacid | Amount | Catalyst |
|---|---|---|---|---|---|
| 1 | internal C14 | 76.7 g<br>0.36 mol | SEB | 72.7 g<br>0.36 mol | 1.5 g |
| 2*) | alpha C10 | 81.3 g<br>0.52 mol | ADI | 75.9 g<br>0.52 mol | 1.0 g |
| 3*) | alpha C12 | 64.5 g<br>0.35 mol | SEB | 70.7 g<br>0.35 mol | 1.4 g |
| 4*) | alpha C10 | 62.5 g<br>0.40 mol | SEB | 80.8 g<br>0.40 mol | 1.4 g |
| 5*) | alpha C12 | 68.2 g<br>0.37 mol | SEB | 74.7 g<br>0.37 mol | 1.4 g |
| 6 | internal C14 | 76.7 g<br>0.36 mol | SEB<br>ADI | 36.4 g<br>0.18 mol<br>26.3 g<br>0.18 mol | 1.4 g |
| 7 | internal C14 | 76.7 g<br>0.36 mol | SEB<br>AZE | 36.4 g<br>0.18 mol<br>33.8 g<br>0.18 mol | 1.4 g |
| 8 | internal C14 | 468.6 g<br>2.20 mol | SEB<br>DDS | 222.2 g<br>1.10 mol<br>253.0 g<br>1.10 mol | 9.4 g |
| 9*) | alpha C16 | 74.5 g<br>0.31 mol | SEB | 62.6 g<br>0.31 mol | 1.4 g |
| 10*) | alpha C14 | 76.7 g<br>0.36 mol | SEB | 72.7 g<br>0.36 mol | 1.5 g |
| 11*) | alpha C14 | 76.7 g<br>0.36 mol | SEB<br>AZE | 36.4 g<br>0.18 mol<br>33.8 g<br>0.18 mol | 1.4 g |
| 12 | internal C14 | 76.7 g<br>0.36 mol | SEB | 72.7 g<br>0.36 mol | 1.5 g |
| 13 | internal C14<br>alpha C16 | 53.7 g<br>0.25 mol<br>26.0 g<br>0.11 mol | SEB | 72.7 g<br>0.36 mol | 1.5 g |
| 14 | internal C14 | 61.3 g<br>0.29 mol | SEB | 72.7 g<br>0.36 mol | 1.5 g |

TABLE 1-continued

Compositions of reaction mixtures used to prepare the working examples and comparative examples.

| Example # | Epoxide | Amount | Diacid | Amount | Catalyst |
|---|---|---|---|---|---|
|  | alpha C16 | 17.3 g 0.07 mol |  |  |  |
| 15 | internal C14 | 85.2 g 0.40 mol | SEB | 40.4 g 0.20 mol | 1.6 g |
|  |  |  | TMAS | 37.6 g 0.20 mol |  |
| 16 | internal C14 | 639.0 g 3.00 mol | SEB | 606.0 g 3.00 mol | 12.5 g |
| 17 | internal C15-18 | 107.3 g 0.40 mol | ADI | 58.4 g 0.40 mol | 1.5 g |

*)comparative example

The alpha-C10 to C16 olefins and epoxides were purchased from Tokyo Chemical Industry. The internal C14 epoxide was prepared following the protocol given further above.

The internal C15-18 epoxides were likewise prepared following the protocol given further above. As starting material was used NEODENE® 151810, a mixture of internal olefins commercially available from Shell. Main fractions are C15, C16, C17 and C18 olefins; average chain length is 16.5.

The reaction times and acid numbers of the resulting polyesters arm shown in the following Table 2.

TABLE 2

Reaction times, hydroxyl numbers (OHN), acid numbers (AN) and C/O-ratios of the resulting polyesters.

| Example # | Time 1 [hours] | Time 2 [hours] | OHN [mg KOH/g] | AN [mg KOH/g] | Ratio C:O |
|---|---|---|---|---|---|
| 1 | 7 | 31 | 20.1 | 1.3 | 6 |
| 2*) | 2 | 31 | n.d. | 25.0 | 4 |
| 3*) | 8 | 31 (+7) | n.d. | 5.1 (2.3**)) | 5.5 |
| 4*) | 13 | 37 | 4.8 | 1.3 | 5 |
| 5*) | 9 | 24 | 10.3 | 0.5 | 5.5 |
| 6 | 7 | 27 | 4.5 | 1.4 | 5.5 |
| 7 | 6 | 43 | 4.2 | 2.1 | 5.9 |
| 8 | 3 | 39 | 4.8 | 2.6 | 6.3 |
| 9*) | 13 | 33 | 15.5 | 1.2 | 6.5 |
| 10*) | 12 | 34 | 12.8 | 0.2 | 6 |
| 11*) | 12 | 20 | 5.2 | 2.0 | 5.9 |
| 12 | 7 | 30 | 9.9 | 1.0 | 6 |
| 13 | 7 | 18 | 29.4 | 1.0 | 6.2 |
| 14 | 9 | 23 | 12.5 | 1.5 | 6.1 |
| 15 | 10 | 22 | 16.3 | 1.5 | 5.9 |
| 16 | 12 | 28 | 20.9 | 1.6 | 6 |
| 17 | 7.5 | 22 | 14.1 | 1.4 | 5.6 |

*)comparative example
**)after addition of 0.82 g of ethylhexanol and additional 7 hours reaction time
n.d. not detectable Table 2 shows that the acid numbers of the working examples are in the range of 1.0 (Examples 12 and 13) to 2.6 (Example 8) mg KOH/g after reaction times of overall 25 hours (Example 13) to 49 hours (Example 7).

Without special end-capping as done for Example 3, the terminal groups of a polyester can be either an OH— or a COOH-function. For oil compatibility and lubricant durability, not more than 30% of the terminal functionalities should be COOH-functionalities.

The C/O-ratios were calculated by summing up the number of carbon atoms present in the diol and in the diacid monomers and dividing the resulting numbers by four (4=number of oxygen atoms in the resulting diester unit). Effects of terminal groups are neglected in this simplified calculation method. For monomer mixtures, the average amount of carbons was used. The resulting ratios for the working examples are between 5.5 (Example 6) and 6.3 (Example 8).

The C/O-ratios are a simple measure for the polarity of the polymer.

The characteristics of the polyesters prepared according to the present invention are shown in the following Table 3.

TABLE 3

Characteristics of the polyesters prepared according to the present invention.

| Example # | $M_n$ [g/mol] | $M_w$ [g/mol] | PDI | BV100 [mm$^2$/s] | PP [° C.] | $T_m$ [° C.] | $T_g$ [° C.] |
|---|---|---|---|---|---|---|---|
| 1 | 3,970 | 12,000 | 3.0 | 212 | −33 | — | −62.4 |
| 2*) | 5,129 | 13,200 | 2.6 | 225 | −24 | — | −57.9 |
| 3*) | 8,260 | 28,200 | 3.4 | 572 | −9 | −6.9 | — |
| 4*) | 10,700 | 33,200 | 3.1 | 1078 | −27 | −27.4 | −55.4 |
| 5*) | 9,030 | 26,800 | 3.0 | 580 | −12 | −5.2 | — |
| 6 | 9,320 | 32,900 | 3.5 | 817 | −9 | — | −54.2 |
| 7 | 4,720 | 22,100 | 4.7 | 459 | −21 | — | −62.1 |
| 8 | 3,620 | 20,800 | 5.7 | 440 | −24 | −35.7 | −57.4 |
| 9*) | 6,000 | 14,600 | 2.4 | **) | 18 | 15.8 | — |
| 10*) | 7,260 | 21,900 | 3.0 | 398 | 3 | 2.3 | — |
| 11*) | 9,010 | 31,900 | 3.5 | 827 | −6 | −1.3 | — |
| 12 | 6,140 | 24,700 | 4.0 | 644 | −24 | — | −58.9 |
| 13 | 2,430 | 7,840 | 3.2 | 62 | −18 | −9.3 −27.7 | −62.6 |
| 14 | 4,140 | 16,300 | 3.9 | 238 | −27 | −28.8 | −55.7 |
| 15 | 2,530 | 8,740 | 3.5 | 88 | −33 | −41.8 | −62.2 |
| 16 | 2,620 | 9,140 | 3.5 | 94 | −36 | −59.0 −45.4 | −65.1 |
| 17 | 3,090 | 16,100 | 5.2 | 150 | −18 | −18.5 | −55.1 |

*)comparative example
**) not measured as viscosity was too high

The number-average molecular weights of the polyesters according to the present inventions are in the range of 2,500 g/mol to 9,400 g/mol. They show melting temperatures below −28° C. and glass transition temperatures of well below −50° C.

To proof the performance of the polyesters in accordance with the present invention in base oils, lubricating compositions were prepared containing different amounts of the polyesters.

The results for the typical performance parameters like KV40, KV100 and VI are presented in the following Tables 4.

TABLE 4a

Characteristics of the polyesters in naphthenic API Group V base oil.

| Ex # | 5% polyester in NS3 | | | 20% polyester in NS3 | | |
|---|---|---|---|---|---|---|
| | KV40 [mm$^2$/s] | KV100 [mm$^2$/s] | VI | KV40 [mm$^2$/s] | KV100 [mm$^2$/s] | VI |
| 1 | 4.02 | 1.55 | n.d. | 11.41 | 3.62 | 236 |
| 2*) | 3.75 | 1.47 | n.d. | 12.03 | 3.37 | 167 |
| 3*) | 4.51 | 1.78 | n.d. | 17.97 | 5.79 | 309 |
| 4*) | 4.79 | 1.91 | n.d. | 22.50 | 7.28 | 325 |
| 5*) | 4.60 | 1.81 | n.d. | 18.79 | 6.05 | 313 |
| 6 | 4.85 | 1.89 | n.d. | 20.79 | 6.59 | 310 |
| 7 | 4.45 | 1.72 | n.d. | 16.30 | 5.16 | 290 |
| 8 | 4.57 | 1.75 | n.d. | 16.97 | 5.40 | 296 |
| 9*) | 4.09 | 1.59 | n.d. | 11.79 | 3.85 | 258 |
| 10*) | 4.39 | 1.72 | n.d. | 16.53 | 5.35 | 303 |
| 11*) | 4.78 | 1.88 | n.d. | 20.45 | 6.65 | 323 |
| 12 | 3.13 | 1.79 | n.d. | 18.37 | 5.75 | 297 |
| 13 | 3.72 | 1.44 | n.d. | 8.50 | 2.79 | 200 |

TABLE 4a-continued

Characteristics of the polyesters in naphthenic API Group V base oil.

| Ex # | 5% polyester in NS3 | | | 20% polyester in NS3 | | |
|---|---|---|---|---|---|---|
| | KV40 [mm$^2$/s] | KV100 [mm$^2$/s] | VI | KV40 [mm$^2$/s] | KV100 [mm$^2$/s] | VI |
| 14 | 4.18 | 1.61 | n.d. | 13.05 | 4.21 | 266 |
| 15 | 3.74 | 1.44 | n.d. | 8.67 | 2.84 | 203 |
| 16 | 3.82 | 1.47 | n.d. | 9.46 | 3.06 | 210 |
| 17 | 3.81 | 1.49 | n.d. | 9.73 | 3.25 | 240 |

*)comparative example
n.d. = not defined

TABLE 4b

Characteristics of the polyesters in API Group I base oil.

5% polyester in 150N Gr I oil

| Example # | KV40 [mm$^2$/s] | KV100 [mm$^2$/s] | VI |
|---|---|---|---|
| 1 | 39.70 | 6.56 | 120 |
| 2*) | not soluble | not soluble | not soluble |
| 3*) | 41.56 | 7.24 | 138 |
| 4*) | not soluble | not soluble | not soluble |
| 5*) | not soluble | not soluble | not soluble |
| 6 | 45.08 | 7.58 | 135 |
| 7 | 42.94 | 7.13 | 127 |
| 8 | 43.50 | 7.23 | 129 |
| 9*) | 39.78 | 6.67 | 122 |
| 10*) | 41.81 | 7.07 | 130 |
| 11*) | 44.09 | 7.54 | 138 |
| 12 | 44.11 | 7.37 | 131 |
| 13 | 36.91 | 6.18 | 115 |
| 14 | 40.76 | 6.81 | 124 |
| 15 | 37.88 | 6.28 | 114 |
| 16 | 38.05 | 6.33 | 116 |
| 17 | 38.17 | 6.38 | 118 |

*)comparative example

TABLE 4c

Characteristics of the polyesters in API Group III base oil.

5% polyester in NB3020

| Example # | KV40 [mm$^2$/s] | KV100 [mm$^2$/s] | VI | PP [° C.] | CP [° C.] |
|---|---|---|---|---|---|
| 1 | 9.82 | 2.81 | 136 | −39 | −38 |
| 2*) | not soluble | not soluble | not soluble | not soluble | not soluble |
| 3*) | not soluble | not soluble | not soluble | not soluble | not soluble |
| 4*) | not soluble | not soluble | not soluble | not soluble | not soluble |
| 5*) | not soluble | not soluble | not soluble | not soluble | not soluble |
| 6 | not soluble | not soluble | not soluble | not soluble | not soluble |
| 7 | 10.59 | 3.03 | 153 | −42 | −36 |
| 8 | 10.74 | 3.06 | 153 | −72 | −39 |
| 9*) | 9.87 | 2.83 | 140 | −36 | 3 |
| 10*) | 10.29 | 2.99 | 156 | −12 | −7 |
| 11*) | 10.88 | 3.2 | 175 | −39 | −17 |
| 12 | 9.16 | 3.13 | 245 | −42 | −40 |
| 13 | 10.90 | 2.61 | 55 | −63 | −25 |
| 14 | 10.06 | 2.88 | 152 | −66 | −39 |
| 15 | 9.28 | 2.64 | 122 | −42 | −39 |
| 16 | 9.44 | 2.68 | 126 | −42 | −40 |
| 17 | 9.38 | 2.70 | 129 | −48 | −45 |

TABLE 4d

Characteristics of the polyesters in API Group III base oil.

5% polyester in NB3043

| Example # | KV40 [mm$^2$/s] | KV100 [mm$^2$/s] | VI |
|---|---|---|---|
| 13 | 23.08 | 4.88 | 139 |
| 14 | 25.05 | 5.31 | 152 |
| 15 | 23.47 | 4.93 | 139 |
| 16 | 23.47 | 4.98 | 139 |
| 17 | 23.41 | 4.98 | 143 |

*)comparative example

Conclusions:

The given examples are all rather apolar polyesters (compared to commercially available polyesters) and are compatible with naphthenic base oils which are known for their good solvency compared to other base oils. For a broad application as thickeners for gear oils, compatibility with API Group I-III base oils is required.

Main parameter for this oil-compatibility is the polarity. The C/O-ratio is a very simple way to display the polarity of different polyesters. As can be seen from Tables 4, the examples with C/O-ratios below 5.5 do not show the required solubility. And even around a C/O-ratio of 5.5, only special polymers like the chain-end modified Example 3 and Example 6 that contain the special diol units which is the core of this invention, show some compatibility with API Group I base oils. An exception here is example 17 which is based on the longer C15-18 epoxide. These long side chains are even able to solubilize a copolymer with adipic acid in Group III base oil despite the low C/O ratio.

As shown for Example 6, the number of branches which are introduced by the monomer unit derived from an internal olefin also has some influence on the solubility of the polyesters at room temperature as well as the molecular weight. Lower molecular weight polyesters show better oil-compatibility than polymers with higher molecular weight (e.g. Example 12 vs. Example 16).

The molecular weight of the polyester is not a very helpful lever to adjust the solubility as molecular weight is a major factor regarding the performance of polymer thickeners. Adjustment of molecular weight balances thickening power and shear stability which are the most fundamental properties of a thickener and the required shear stability level is basically defined by the application. For gear oils, the shear stability levels are known to be very severe. That means that polymers with a weight-average molecular weight above 35,000 g/mol are not suitable for demanding applications.

Additionally, the effect of the special diols derived from internal olefins is not big when only the viscometric data above room temperature are considered. However, gearboxes are also operated at lower temperatures, so gear oils also have to meet demanding low-temperature requirements. Cloud point measurements indicate a phase separation at lower temperatures. The cloud point of the pure Nexbase 3020 sample was measured to be −37° C., which indicates the point at which the waxy components of the oil begin to crystallize. The pour point measurement is not always sensitive towards this crystallization due to the speed of the process (it may be even beneficial due to a PPD effect), but gear oil specifications include Brookfield methods in which the oil samples are stored at low temperatures for a longer time. In such measurements, also slow crystallization processes are detected and have huge negative influence.

The comparative Examples 9 to 11 which are sufficiently apolar and show good solubility in Nexbase 3020 have cloud points above −20° C. which indicates a phase separation of the polyester. This is supported by DSC measurements which showed melting points for these polyesters above −5° C. The examples according to the invention do not have melting points above −15° C. and show cloud points similar to the pure oil indicating excellent compatibility over the required temperature range.

The limits can be seen in comparing Example 14 with Example 13. For these examples, terminal C16-epoxide was mixed with the internal C14-epoxide. With 20 mol % of the terminal epoxide (Example 14), no negative effect on the cloud point is observed while at 30 mol % of the terminal epoxide (Example 13) a second crystallization peak around −10° C. was determined by DSC and the cloud point is increased.

Special behavior with regard to low temperature performance is again shown by Example 17. Despite the comparably high melting point at −18° C., the solution in Nexbase 3020 remains clear and liquid down to temperatures below −40° C. which indicates the outstanding compatibility of this sample.

The invention claimed is:

1. A polyester, obtained from reaction of:
    an internal epoxide derived from an internal olefin comprising 10 to 24 carbon atoms, or a diol derived from the internal epoxide,
    with
    at least one saturated linear aliphatic dicarboxylic acid comprising 5 to 13 carbon atoms,
    wherein the polyester has a number-average molecular weight $M_n$ in a rage of from 1,000 to 15,000 g/mol, determined by size exclusion chromatography (SEC) using polymethylmethacrylate standards.

2. The polyester according to claim 1, wherein the internal olefin comprises not more than 30 mol % of double bonds being in the alpha-position.

3. The polyester according to claim 1, wherein the internal olefin comprises 12 to 20 carbon atoms.

4. The polyester according to claim 1, wherein the at least one saturated linear aliphatic dicarboxylic acid is selected from the group consisting of glutaric acid (pentanedioic acid), 2,2-dimethylglutaric acid (2,2-dimethylpentanedioic acid), adipic acid (hexanedioic acid), 2,4,4-trimethyladipic acid (2,4,4-trimethylhexanedioic acid), pimelic acid (heptanedioic acid), suberic acid (octanedioic acid), azelaic acid (nonanedioic acid), sebacic acid (decanedioic acid), undecanedioic acid, dodecanedioic acid, brassylic acid (tridecanedioic acid), and a mixture thereof.

5. The polyester according to claim 1, wherein the polyester has a melting point of equal to or below −15° C.

6. The polyester according claim 1, wherein the polyester has a glass transition temperature of equal to or below −50° C.

7. The polyester according to claim 1, having a kinematic viscosity at 100° C. (KV100) in the range of 40 to 2000 cSt.

8. The polyester according to claim 1, wherein a molar ratio of carbon to oxygen, calculated by summing up the number of carbon atoms present in the diol and in diacid monomers and dividing the resulting numbers by four as being the number of oxygen atoms in a resulting diester unit, is in the range of 4:1 to 12:1.

9. A method of lubricating an industrial gear, comprising:
    preparing a lubricant formulation comprising the polyester according to claim 1 as a base oil,
    optionally, adding a further base oil selected from the group consisting of API Group II oils, API Group III oils, API Group IV oils, and a mixture thereof, to the lubricant formulation, and
    applying the lubricant formulation to the industrial gear.

10. A lubricating composition, comprising:
    (A) 20 to 60% by weight of at least one polyester prepared from an internal epoxide derived from an internal olefin comprising 10 to 24 carbon atoms, or from a diol derived from the internal epoxide, and at least one saturated linear aliphatic diacid comprising 5 to 13 carbon atoms,
        wherein the polyester has a number-average molecular weight of from 1,000 to 15,000 g/mol, determined by size exclusion chromatography (SEC) using polymethylmethacrylate standards;
    (B) 40 to 80% by weight of a base oil selected from the group consisting of API Group II oils, API Group III oils, API Group IV oils, and a mixture thereof; and
    (C) 0 to 5% by weight of one or more additives,
        based on a total weight of the lubricating composition.

11. The lubricating composition according to claim 10, wherein the internal olefin of component (A) comprises 12 to 20 carbon atoms.

12. The lubricating composition according to claim 10 wherein the one or more further additives (C) are selected from the group consisting of pour point depressants, dispersants, defoamers, detergents, demulsifiers, antioxidants, antiwear additives, extreme pressure additives, friction modifiers, anticorrosion additives, dyes, and a mixture thereof.

13. A method for preparing the polyester according to claim 1, the method comprising:
(a) isomerizing an alpha-olefin comprising 10 to 24 carbon atoms, to the internal olefin;
(b) epoxidizing the internal olefin retrieved under (a);
(c1) reacting the internal epoxide retrieved under (b) with the at least one saturated linear aliphatic dicarboxylic acid comprising 5 to 13 carbon atoms, or
(c2) transferring the internal epoxide retrieved under (b) to the corresponding diol and reacting the diol with the at least one saturated linear aliphatic dicarboxylic acid comprising 5 to 13 carbon atoms; and
(d) isolating the polyester.

14. The polyester according to claim 2, wherein the internal olefin comprises not more than 20 mol % of the double bonds in the alpha-position.

15. The polyester according to claim 3, wherein the internal olefin comprises 14 to 18 carbon atoms.

16. The polyester according to claim 4, wherein the at least one saturated linear aliphatic dicarboxylic acid is selected from the group consisting of azelaic acid (nonanedioic acid), sebacic acid (decanedioic acid), dodecanedioic acid, and a mixture thereof.

17. The polyester according to claim 5, wherein the polyester has a melting point of equal to or below −25° C.

18. The polyester according to claim 7, wherein the KV100 is in the range of 100 to 1,000 cSt.

19. The method according to claim 9, wherein the lubricant formulation is a gear oil formulation.

20. The polyester according to claim 1, wherein the polyester has a number-average molecular weight $M_n$ in a range of 2,000-15,000 g/mol.

21. The polyester according to claim 1, wherein the polyester has a polydispersity index $M_w/M_n$ in a range of 1.5 to 6.

22. The polyester according to claim 1, wherein the polyester is not a diester.

* * * * *